ated Sept. 6, 1960

2,951,760

GROWTH ACCELERATING SUBSTANCES

Herbert G. Luther and Warren M. Reynolds, Terre Haute, Ind., assignors to Chas. Pfizer & Co., Inc., New York, N.Y., a corporation of Delaware No Drawing. Filed Dec. 27, 1957, Ser. No. 705,503

12 Claims. (Cl. 99—2)

This invention relates to growth accelerating substances, and more particularly to the fortification and improvement of standard, nutritionally-balanced feeds by the addition thereto of certain dietary supplements. This application is a continuation-in-part of our co-pending application, Serial No. 475,583, filed December 15, 1954, now abandoned.

The use of antibiotics in supplementing the feeds of various nonruminant animals, such as chickens, turkeys, hogs, ducks, etc., has become common practice. In general, antibiotic feed supplementation results in accelerated growth of the animals consuming the supplemented feeds, greater feed efficiency, and consequently, more economical operation for the farmer or grower. However, in the case of ruminant animals, such as sheep and cattle, the use of antibiotics in feeds has not yet gained appreciable acceptance.

It has now been found that the addition of antibiotics to the feeds of ruminants is not only practical, but also, that it becomes highly advantageous, when a proportion of an orally active estrogenic substance is employed in admixture therewith. An especially efficacious supplement is provided by combining a tetracycline type antibiotic and an orally active stilbene derivative, in an amount sufficient to accelerate the growth of animals to which they are fed after incorporation into the appropriate feed.

Tetracycline is a recently discovered antibiotic characterized by a tetracyclic aromatic nucleus, also common to oxytetracycline and chlortetracycline. Oxytetracycline and chlortetracycline structurally differ from one another and from tetracycline primarily in that oxytetracycline contains a nuclear hydroxy group that neither tetracycline nor chlortetracycline possesses, while chlortetracycline contains a nuclear chlorine atom that neither oxytetracycline nor tetracycline possesses. Oxytetracycline can be recovered from the metabolism products of *Streptomyces rimosus*, as more fully described in U.S. Patent 2,516,080 to Sobin et al., issued July 18, 1950, and referring to the antibiotic by its trademark "Terramycin." Chlortetracycline in turn can be recovered from the metabolism products of *Streptomyces aureofaciens*, as described in U.S. Patent 2,482,055 to Duggar, issued September 13, 1949, and referring to the antibiotic by its trademark "Aureomycin." Tetracycline is readily produced by the catalytic dehalogenation of chlortetracycline, or it can also be produced directly by fermentation methods from selected strains of microorganisms of the genus *Streptomyces*.

In this specification and in the claims the expression, "a tetracycline-type antibiotic" means an antibiotic having a chemical structure characterized by a tetracycline nucleus and refers not only to pure or free oxytetracycline, chlortetracycline and tetracycline, but also to their antibiotically active derivatives, in which form they are or can be used. Such derivatives include calcium chloride combination products, hydrochlorides, sodium and potassium salts, quaternary ammonium salts and the like. Similarly, the expression "oxytetracycline" refers not only to free oxytetracycline but also to such derivatives, combination products and/or salts.

Suitable stilbene derivatives which may be used in accordance with the present invention are diethylstilbestrol, dienestrol, hexestrol; their lower alkyl ethers, such as dianisylhexene, dianisylhexadiene and dianisylhexane; and esters such as dienestrol diacetate. Diethylstilbestrol is particularly effective. However, whether the advantageous effects produced by these substances is due to their estrogenic activities or due to some other mechanism is not known, and applicants do not wish to be bound to any theory with respect to their action.

Diethylstilbestrol, commonly referred to as stilbestrol, is a well-known synthetic organic chemical possessing estrogenic activity. It has been used principally as a therapeutic agent in medicine, where it is employed for its estrogenic properties. It has also been used to a limited degree in stimulating the growth of certain poultry. However, in this application of the hormone, it is surgically implanted in pellet form under the skin of the poultry. When the same technique is applied to ruminants, such as steers, certain disadvantages have been observed.

On the other hand, when diethylstilbestrol is combined with a tetracycline type antibiotic in accordance with the present invention and administered orally as a feed supplement or in the form of an animal feed, the disadvantages of pellet implantation are obviated. Moreover, the combinations markedly increase the rate of growth of ruminants over that which is obtainable with either the hormone or antibiotic alone. In addition, the diethylstilbestrol as thus employed gives indications of promoting the digestion of cellulose by such animals. It is understood, however, that the compositions of this invention are not confined to accelerating the growth of ruminants, but may be employed in the feeding of non-ruminants as well.

The relative proportions of the tetracycline type antibiotic and the estrogenic substance in feeds and feed concentrates may vary somewhat, depending upon the feed with which they are employed and the animal consuming the same. In general, from about 98 to 75% of the tetracycline antibiotic, when mixed with about 2 to 25% of the estrogen, will produce excellent results. These substances are advantageously combined in such relative proportions with edible carriers to provide concentrates which may readily be blended with standard nutritionally balanced feeds or which may be used themselves as an adjunct to the normal feedings.

A wide variety of carriers may be employed in the preparation of concentrates containing the aforesaid supplements. Suitable carriers include the following: Soybean oil meal, cotton seed oil meal, sunflower seed meal, linseed oil meal, cornmeal and corncob meal. The carrier facilitates uniform distribution of the active materials in the finished feed with which the concentrate is blended. This is especially important because only a small proportion of these potent materials are required. It is preferred to impregnate the supplements thoroughly into the carrier, particularly the estrogen, to minimize the formation of dust having estrogenic activity when preparing the concentrate and in blending the same with feeds. In this connection, the estrogenic substance and/or antibiotic may be dispersed or dissolved in a suitable oily vehicle, such as soybean oil, corn oil or cotton seed oil, or in a volatile organic solvent, and then blended with the carrier. The concentrate may then be surface coated, if desired, with various proteinaceous materials or edible waxes, such as zein, gelatin, microcrystalline wax and the like to provide a protective film which seals in the active ingredients. It will be appreciated that the proportions of the antibiotic and estrogen in such concentrates are capable of wide variation, since the amount of active materials in the finished feed may be adjusted by blending the appropriate proportion of concentrate with the feed to obtain the desired degree of supplementation. In the preparation of high potency concentrates, i.e. premixes, suitable for blending by feed manufacturers to produce finished feeds or concentrates of lower potency, the antibiotic content may range from about 3.0 to 80 gm. per pound of concentrate and the estrogenic substance from about 0.5 to 5 gm. per pound of concentrate. A particularly useful concentrate is provided by blending 1 gm. of diethylstilbestrol and 8 gm. of oxytetracycline with one pound of soybean oil meal. Other dietary supplements, such as vitamins, minerals, etc., may be added to the concentrates in the appropriate circumstances.

The high potency concentrates may be blended by the feed manufacturer with proteinaceous carriers, such as soybean oil meal, to produce concentrated supplements which are suitable for direct feeding to animals. In such instances, the animals are permitted to consume the usual diet of roughage, such as hay, silage and the like. The proportion of the tetracycline antibiotic in these supplements may vary from about 16 to 480 mg. per pound of supplement and the estrogenic substance may be employed in an amount of from about 2 to 30 mg. per pound of supplement.

The concentrates described may also be added to animal feeds containing the necessary roughage to produce a nutritionally balanced, finished feed containing from about 2.0 to 5.0 mg. of the antibiotic per pound of feed and from about 0.28 to 1.7 mg. of the estrogen per pound of finished feed. In the case of ruminants, the finished feed should contain protein, fat, fiber, carbohydrate, vitamins and minerals, each in an amount sufficient to meet the nutritional requirements of the animal for which the feed is intended. These materials are preferably present in the following proportions in the finished feed: Protein 10 to 14%; fat 2.5 to 3.5%; fiber 16 to 10%; nitrogen free extract 65 to 68% (dry basis); minerals (ash) 5 to 6%; together with supplementary vitaminaceous sources. Most of these substances are present in naturally occurring feed materials, such as alfalfa hay, or meal, cracked corn, whole oats, soybean oil meal, cornstalk silage, ground corn cobs, wheat bran, and dried molasses. Bone meal, limestone, iodized salt and trace minerals are frequently added to supply the necessary minerals, and urea to provide additional nitrogen. A typical feed suitable for cattle and other ruminants is listed below:

| | Percent |
|---|---|
| Corn | 50 |
| Chopped hay | 46 |
| Soybean oil meal | 3 |
| Bonemeal | 1 |
| | 100 |

In the case of non-ruminant animals, such as poultry and hogs, a suitable feed may contain from about 50 to 80% of grains, 3 to 10% animal protein, 5 to 30% vegetable protein, 2 to 4% of minerals, together with supplementary vitaminaceous sources. These feeds may also be supplemented with one or more of the various forms of penicillin, such as procaine penicillin, dibenzylethylenediamine penicillin, or with other antibiotics such as carbomycin, bacitracin, ilotycin, and the like.

Only minor proportions of the tetracycline antibiotic and estrogenic substance are required to impart substantial growth-accelerating properties to animal feeds or supplements such as those previously described. When employed in the proportions set forth, these feeds or concentrates will make available to the animal a sufficient amount of the active ingredients to achieve the desired growth acceleration. It should be appreciated that the actual amount of antibiotic and estrogen consumed by animals will vary not only with their proportions in the feed or concentrate, but also with the particular animal and its feeding habits. In general, however, the proportions should be so adjusted as to provide from about 17.5 to 160 mg. of the tetracycline type antibiotic and from about 1.5 to 10 mg. of estrogen per head per day. For example, a 60 to 100 pound lamb may require 17.5 to 30 mg. of the tetracycline type antibiotic per day and 1.5 to 3 mg. of the estrogenic substance per day. On the other hand, a 700 to 1000 pound steer may require as much as 80 to 160 mg. of the antibiotic per day and 5 to 10 mg. of the estrogen per day.

The invention is further illustrated by the following examples which are not intended to impose any limitation on the scope of protection conferred hereunder.

EXAMPLE I

The efficacy of combinations of oxytetracycline and diethylstilbestrol in promoting the growth of ruminants was demonstrated in a series of experiments on lambs. In these experiments, feeder lambs made up of equal numbers of wethers and ewes, averaging 70 pounds, were divided into 7 groups composed of 8 wethers and 8 ewes each. These groups were allotted to different pens and fed a basal ration supplemented with proportions of oxytetracycline and diethylstilbestrol, both alone and in combination. A control was also run. During the first 10 days of feeding, a high roughage ration (basal ration No. 1) was employed, while a ration (basal ration No. 2) higher in concentrates was fed thereafter. The composition of these basal rations is indicated below:

| Ingredients | Basal Ration No. 1 | Basal Ration No. 2 |
|---|---|---|
| Chopped Alfalfa Hay | 70.0 | 60.00 |
| Cracked Corn | 12.5 | 26.25 |
| Whole Oats | 12.5 | 8.75 |
| Soybean Oil Meal (44%) | 5.0 | 5.00 |
| | 100.0 | 100.00 |

The lambs were observed daily and weighed weekly.

The results of these experiments, after 53 days of treatment as described, are set forth in Table I.

Table I

FEEDER LAMB AVERAGE DAILY GAINS

| Group | Average Supplementation, mg./lb. feed | Average Daily Gain, lbs. | Difference From Control |
|---|---|---|---|
| 1 | None (Control) | 0.31 | |
| 2 | oxytetracycline 5 mg./lb. | 0.31 | 0.00 |
| 3 | diethylstilbestrol 0.85 mg./lb. | 0.34 | 0.03 |
| 4 | diethylstilbestrol 1.7 mg./lb. | 0.25 | (−)0.06 |
| 5 | oxytetracycline 5 mg./lb. plus diethylstilbestrol 0.85 mg./lb. | 0.40 | 0.09 |
| 6 | oxytetracycline 5 mg./lb. plus diethylstilbestrol 1.7 mg./lb. | 0.36 | 0.05 |

As indicated above, the combination of oxytetracycline and diethylstilbestrol produced appreciably better growth than the controls, or the feeds supplemented with oxytetracycline alone or diethylstilbestrol alone. Thus, the efficacy of the combination was clearly demonstrated.

EXAMPLE II

In further tests, oxytetracycline and diethylstilbestrol were incorporated, both alone and in combination, into the basal ration of steers. For purposes of these tests, 80 Hereford steers, averaging 750 lbs. initially, were divided into groups of 10, which were respectively fed in replicate the following rations:

(a) Basal ration (control)
(b) Basal ration+sufficient oxytetracycline to provide an average intake of 133 mg./head/day. (5 mg./lb. feed)
(c) Basal ration+sufficient diethylstilbestrol to provide an intake of 10 mg./head/day. (0.37 mg./lb. feed)
(d) Oxytetracycline 133 mg./head/day+diethylstilbestrol 10 mg./head/day The basal ration was varied during the course of the experiment as indicated below, ration No. 1 being employed for the first and second weeks, ration No. 2 for the third and fourth weeks and ration No. 3 for the remainder of the test period, which was 128 days, i.e., a sufficient period to bring the animals to market weight of about 1,000 to 1,200 pounds.

| Ingredient | Ration No. 1, percent | Ration No. 2, percent | Ration No. 3, percent |
|---|---|---|---|
| Chopped alfalfa hay | 52.40 | 41.30 | 32.0 |
| Ground yellow corn | 30.00 | 38.00 | 44.8 |
| Whole Oats | 8.60 | 10.90 | 12.8 |
| Whole bran | 4.28 | 5.44 | 6.4 |
| Linseed oil meal | 2.36 | 2.18 | 2.0 |
| Soybean oil meal | 2.36 | 2.18 | 2.0 |

The following mineral supplement was fed free-choice to all animals: Ground limestone 40; steamed bone meal, 40; trace-mineralized salt, 20.

The results of these tests are set forth in the following table, which indicates the average daily gain of each group of animals, the growth index of the supplemented feed, the feed efficiency in terms of pounds of feed per pound of gain and the feed efficiency index. The dollar savings effected by oxytetracycline and diethylstilbestrol are also indicated.

Table II

| Gain | A Control | B OTC* | C DES* | D OTC+DES |
|---|---|---|---|---|
| Average Daily Gain | 2.25 | 2.47 | 2.47 | 2.94 |
| Growth Index | 100 | 110 | 110 | 131 |
| Feed Efficiency: | | | | |
| Lb. feed/lb. gain | 11.25 | 10.78 | 9.84 | 9.05 |
| Feed Efficiency Index | 100 | 104 | 114 | 124 |
| Dollar Savings Over Control | | $2.02 | $9.02 | $13.77 |

*OTC=oxytetracycline; DES=diethylstilbestrol.

In the foregoing table, "growth index" equals:

$$\frac{\text{Average gain produced by the supplemented feed}}{\text{Average gain produced by the unsupplemented feed}} \times 100$$

and "feed efficiency index" equals:

$$\frac{\text{Lbs. of feed per lb. of gain produced by the unsupplemented feed}}{\text{Lbs. of feed per pound of gain produced by the supplemented feed}} \times 100$$

The unsupplemented feed or control is arbitrarily assigned a "growth index" and "feed efficiency index" of 100.

The foregoing results indicate that oxytetracycline, when added to the control ration, improves the rate of gain ("growth index") and feed efficiency ("feed efficiency index") by 10% and 4% respectively, over the unsupplemented control. Diethylstilbestrol improves the rate of gain and feed efficiency by 10% and 14%, respectively, over the unsupplemented control. The combination of oxytetracycline and diethylstilbestrol, however, improves the rate of gain by 31% and the feed efficiency by 24% over the unsupplemented control. Statistical analysis of these data showed that weight gains for the combination of diethylstilbestrol and oxytetracycline were significantly greater than those for the groups receiving diethylstilbestrol and no oxytetracycline. Moreover, the groups receiving diethylstilbestrol plus oxytetracycline showed significantly greater weight gains than those receiving no hormone at the same antibiotic level. It should also be noted that the use of oxytetracycline alone effected an economy of approximately $2.02 per steer, diethylstilbestrol alone effected an economy of approximately $9.02 per steer and the combination effected an economy of approximately $13.77 per steer.

EXAMPLE III

An additional cattle experiment was conducted with 64 Hereford steers divided into four lots of 16, average initial weight of 750 lbs., which were fed in groups the following supplements for a 98-day fattening period.

A. Basal ration (control)
B. Basal+OTC, 160 mg. per head per day (5.0 mg./lb. feed)
C. Basal+DES, 10 mg. per head per day (0.31 mg./lb. feed)
D. Basal+DES, 10 mg.+TM, 160 mg. per head per day The basal ration used was a complete feed of the following composition:

| Ingredient: | Percent |
|---|---|
| Cottonseed hulls | 22 |
| Ground corn cobs | 8 |
| Ground yellow corn corn | 22 |
| Molasses | 10 |
| Barley | 25 |
| Cottonseed meal | 9 |
| Dicalcium phosphate | 2 |
| Limestone | 1 |
| Trace mineralized salt | 1.0 |
| | 100 |

In addition, vitamin A was supplied at the rate of 200,000 I.U. per 100 lbs.

The results of the trial are set forth in the following table. Growth index and feed efficiency index, as well as dollar savings over the control are given and are calculated on the same basis as in the previous example.

Table III

| Gain | A Control | B OTC* | C DES* | D OTC+DES |
|---|---|---|---|---|
| Average Daily Gain | 2.37 | 2.45 | 2.61 | 2.97 |
| Growth Index | 100 | 103 | 110 | 125 |
| Feed Efficiency: | | | | |
| Lb. Feed/Lb. Gain | 13.05 | 12.94 | 11.80 | 10.80 |
| Feed Efficiency Index | 100 | 101 | 111 | 121 |
| Dollar Savings Over Control | | $0.46 | $5.12 | $8.18 |

*OTC=oxytetracycline; DES=diethylstilbestrol.

EXAMPLE IV

A further experiment was conducted with 68 Hereford steer calves divided equally into four groups of 17 animals. The animals were fed in feedlot for a 168-day test period and received the following supplements to the basal ration:

A. Basal ration (control)
B. Basal+OTC, 10 mg. per 100 lbs. live weight per day (2 mg./lb. feed)
C. Basal+DES, 10 mg. per head per day (0.28 mg./lb. feed)
D. Basal+DES, 10 mg. per head+TM, 10 mg. per 100 lbs. live weight per day The following average daily ration was consumed:

| Ingredient: | Lb. |
|---|---|
| Cottonseed meal | 1.44 |
| Milo grain | 7.9–8.57 |
| Alfalfa hay, chopped | 2.78–3.02 |
| Hegari silage | 19.92–21.49 |

The following table sets forth the final results of this experiment:

Table IV

| Gain | A Control | B OTC* | C DES* | D OTC+DES |
|---|---|---|---|---|
| Average Daily Gain | 2.1 | 2.00 | 2.18 | 2.41 |
| Growth Index | 100 | 95 | 104 | 115 |
| Feed Efficiency: | | | | |
| Lb. Feed/Lb. Gain | 15.26 | 16.11 | 14.74 | 14.33 |
| Feed Efficiency Index | 100 | 94 | 103 | 106 |
| Dollar Savings Over Control | | | | |

*OTC=oxytetracycline; DES=diethylstilbestrol.

EXAMPLE V

The results described in Examples I and IV are further summarized in the following table, which expresses the synergistic concentrations of antibiotic and hormone in terms of milligrams per pound of total feed, milligrams per pound of body weight per day, milligrams per head per day, and milligrams per pound of feed supplement based on cattle supplementation of 0.33 to 5 pounds of supplement per day and lamb supplementation of 0.1 to 0.5 pounds of supplement per day.

Table V

| | Oxytetracycline | | | | Diethylstilbestrol | | | |
|---|---|---|---|---|---|---|---|---|
| | Mg./lb. Total Feed | Mg./lb. Body Wt./Day | Mg./ Head/ Day | Mg./lb.[1] Suppl. | Mg./lb. Total Feed | Mg./lb. Body Wt./Day | Mg./ Head/ Day | Mg./lb.[1] Suppl. |
| Lambs: | | | | | | | | |
| Example I | 5 | .21 | 17.5 | 35-175 | .85 | .018 | 1.5 | 3-15 |
| Example I | 5 | .21 | 17.5 | 35-175 | 1.70 | .036 | 3.0 | 6-30 |
| Cattle: | | | | | | | | |
| Example II | 5 | .149 | 133 | 27-400 | .37 | .0111 | 10 | 2-30 |
| Example III | 5 | .178 | 160 | 32-480 | .31 | .0111 | 10 | 2-30 |
| Example IV | 2.0 | .100 | 80 | 16-240 | .28 | .0150 | 10 | 2-30 |

[1] Cattle supplement—0.33-5 lb./day; Lamb Supplement—0.1-0.5 lb./day.

Resort may be had to such modifications and equivalents as fall within the spirit of the invention and the scope of the appended claims.

What is claimed is:

1. A growth-accelerating animal feed concentrate comprising from about 98 to 75% of a tetracycline type antibiotic and from about 2 to 25% of an orally active estrogenic substance.

2. A growth-accelerating animal feed concentrate for ruminant animals comprising, as the principal active ingredients per pound of concentrate, from about 3.0 to 80 gm. of a tetracycline type antibiotic and from about 0.5 to 5 gm. of an orally active stilbene derivative.

3. The composition of claim 2, in which the tetracycline type antibiotic is oxytetracycline.

4. The composition of claim 2, in which the tetracycline type antibiotic is tetracycline.

5. The composition of claim 2, in which the stilbene derivative is diethylstilbestrol.

6. The composition of claim 2, in which the stilbene derivative is dienestrol.

7. A growth-accelerating animal feed concentrate for ruminant animals comprising, as the principal active ingredients, per pound of concentrate, from about 3.0 to 80 mm. of a tetracycline type antibiotic and from about 0.5 to 5.0 gm. of a stilbene derivative, and surface-coated with a sealing film selected from the class consisting of proteinaceous materials and edible waxes.

8. A growth-accelerating animal feed concentrate for ruminant animals comprising, as the principal active ingredients, per pound of concentrate, from about 3.0 to 80 gm. of a tetracycline type antibiotic, from about 0.5 to 5 mg. of diethylstilbestrol and a carrier therefor, and surface-coated, with a sealing film selected from the class consisting of proteinaceous materials and edible waxes.

9. A growth-accelerating animal feed supplement for ruminant animals comprising a proteinaceous carrier containing per pound of said supplement from about 16 to 480 mg. of a tetracycline type antibiotic and from about 2 to 30 mg. of diethylstilbestrol.

10. A growth-accelerating animal feed for ruminant animals which comprises nutritionally-balanced quantities of protein, fat, fiber, carbohydrate, vitamins and minerals, and from about 2.0 to 5.0 mg. of a tetracycline type antibiotic combined with from about 0.28 to 1.7 mg. of diethylstilbestrol per pound of feed.

11. A growth-accelerating animal feed for ruminant animals which comprises about 2.0 to 5.0 mg. of oxytetracycline and from about 0.28 to 1.7 mg. of diethylstilbestrol dispersed, per pound, in a feed composition containing substantially 10 to 14% protein, 2.5 to 3.5% fat, 16 to 10% fiber, 65 to 68% nitrogen free extract, 5 to 6% minerals together with supplementary vitaminaceous sources.

12. A method for accelerating the growth of ruminant animals which comprises feeding said animals, in conjunction with a nutritionally balanced ration, from about 17.5 to 160 mg. of a tetracycline type antibiotic and from about 1.5 to 10 mg. of diethylstilbestrol per head per day.

References Cited in the file of this patent

UNITED STATES PATENTS 2,773,770   Maki _____ Dec. 11, 1956

OTHER REFERENCES

Stothers et al.: Jr. Animal Science 15 (1956), page 1293.

Sewell et al.: Jr. Animal Science, February 1957, vol. 16, pp. 20-25.